United States Patent
Baumgartner et al.

(10) Patent No.: US 11,312,179 B2
(45) Date of Patent: Apr. 26, 2022

(54) NON-PNEUMATIC WHEEL AND METHOD OF MOUNTING NON-PNEUMATIC TIRE

(71) Applicant: COMPAGNIE GENERALE DES ETABLISSEMENTS MICHELIN, Clermont-Ferrand (FR)

(72) Inventors: Gerard Baumgartner, Givisiez (CH); Daniel Walser, Givisiez (CH); Antonio Delfino, Givisiez (CH)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 300 days.

(21) Appl. No.: 16/472,759

(22) PCT Filed: Dec. 22, 2016

(86) PCT No.: PCT/IB2016/057950
§ 371 (c)(1),
(2) Date: Jun. 21, 2019

(87) PCT Pub. No.: WO2018/115940
PCT Pub. Date: Jun. 28, 2018

(65) Prior Publication Data
US 2021/0129588 A1 May 6, 2021

(51) Int. Cl.
*B60C 7/24* (2006.01)
*B60B 9/26* (2006.01)
(Continued)

(52) U.S. Cl.
CPC .................. *B60C 7/24* (2013.01); *B60B 9/26* (2013.01); *B60B 21/00* (2013.01); *B60C 7/18* (2013.01); *B60C 7/146* (2021.08)

(58) Field of Classification Search
CPC .. B60C 7/24; B60C 7/18; B60C 7/146; B60B 9/26; B60B 21/00; Y10T 29/49494; Y10T 29/49508
See application file for complete search history.

(56) References Cited

U.S. PATENT DOCUMENTS 1,115,178 A * 10/1914 Davis, Sr. ................. B60B 9/26
                                                                      152/80
6,286,572 B1    9/2001 Chen
(Continued)

FOREIGN PATENT DOCUMENTS

FR     3032381 A1 *  8/2016  ............... B60B 5/02
GB         12636       11/1911
(Continued)

OTHER PUBLICATIONS

International Search Report dated Sep. 7, 2017 for International Application No. PCT/IB2016/057948.
(Continued)

*Primary Examiner* — Kip T Kotter
(74) *Attorney, Agent, or Firm* — Dority & Manning, P.A.

(57) ABSTRACT

A non-pneumatic wheel (100) including a hub (300) and a non-pneumatic tire (102), as well as a method for mounting the non-pneumatic tire (102) onto the hub (300). The hub (300) is formed with grooves (318) that receive the radially-inner ends (110) of spokes (106) of the non-pneumatic tire (102). To secure the tire (102) onto the hub (300) during assembly, the grooves (318) with the radially inner ends (110) of the spokes (106) received therein are pulled radially inward to decrease the diameter of the hub (300) and increase tension in the spokes (106).

18 Claims, 6 Drawing Sheets

(51) Int. Cl.
*B60C 7/18* (2006.01)
*B60C 7/14* (2006.01)
*B60B 21/00* (2006.01)

(56) References Cited

U.S. PATENT DOCUMENTS

| | | |
|---|---|---|
| 9,180,732 B2 | 11/2015 | Endicott |
| 2007/0267116 A1 | 11/2007 | Rhyne et al. |
| 2008/0179940 A1* | 7/2008 | Hill .................. B60C 7/102 |
| | | 301/105.1 |
| 2008/0303337 A1* | 12/2008 | Krantz ............... B60B 23/08 |
| | | 301/5.306 |
| 2009/0211675 A1 | 8/2009 | Louden |
| 2011/0126948 A1 | 6/2011 | Boyer et al. |
| 2016/0016426 A1 | 1/2016 | Endicott |
| 2018/0037054 A1 | 2/2018 | Cron et al. |
| 2018/0134071 A1* | 5/2018 | Celik ..................... B60B 9/26 |
| 2018/0345718 A1* | 12/2018 | Delfino ............... B60B 1/0261 |

FOREIGN PATENT DOCUMENTS

| | | |
|---|---|---|
| JP | 2012077974 | 1/2012 |
| WO | WO 2011/025491 | 3/2011 |
| WO | WO 2016/109702 | 7/2016 |

OTHER PUBLICATIONS

International Search Report dated Aug. 29, 2017 for International Application No. PCT/IB2016/057953.
International Search Report dated Sep. 8, 2017 for International Application No. PCT/IB2016/057950.

\* cited by examiner

NON-PNEUMATIC WHEEL AND METHOD OF MOUNTING NON-PNEUMATIC TIRE

PRIORITY STATEMENT

The present application is a subsequent Application of and claims priority to PCT/IB2016/057950, filed Dec. 22, 2016, which is incorporated herein by reference for all purposes.

FIELD OF THE INVENTION

The subject matter of the present disclosure relates generally to a non-pneumatic wheel and to a method of mounting a non-pneumatic tire onto a hub.

BACKGROUND OF THE INVENTION

Non-pneumatic wheel constructions and their benefits are described in e.g., U.S. Pat. Nos. 6,769,465; 6,994,134; 7,013,939; and 7,201,194, which are incorporated herein by reference in their entirety. Some non-pneumatic tire constructions propose incorporating an annular band, sometimes referred to as e.g., a shear band, a band with a shear layer, or a compliant band, Embodiments of such are described in e.g., U.S. Pat. Nos. 6,769,465 and 7,201,194. Such non-pneumatic tires provide advantages in tire performance without relying upon a gas inflation pressure for support of the loads applied to the tire.

In one example of a non-pneumatic wheel, a compliant band with a ground contacting portion can be connected with a plurality of tension-transmitting, web-like elements (i.e. spokes) extending radially outward from a center element or hub. As such non-pneumatic wheel rolls over the ground surface, the tension-transmitting elements opposite the ground contacting portion of the wheel support the hub in tension. Specifically, the hub is suspended from the top of the wheel instead of being primarily supported by compression of such elements located between the hub and the ground surface as is typical of e.g., solid wheel constructions where a hub is encircled by solid rubber or layers of rubber.

For certain constructions, such non-pneumatic wheel may be formed by open cast molding in which a material such as e.g., polyurethane is poured into a mold that forms all or part of the non-pneumatic tire. One or more inextensible reinforcement structures such as cords may be molded in place in the compliant band. Typically, in such prior constructions, the spokes and the hub are molded as an integral, single-piece construction. Alternatively, the spokes may be integrally joined by a band that is then joined with a hub or wheel center. In either construction, the spokes are not readily removable from either the radially-outer end attached with the compliant band or the radially-inner end attached to the hub or wheel center.

The construction and configuration of the spokes can affect the performance of the non-pneumatic wheel. Spokes constructed from different sizes, configurations, and materials of construction can affect the way tension is transmitted between the wheel hub and the compliant band, leading to differences in load carrying capabilities of the non-pneumatic wheel and perceived handling characteristics. The density of the spokes can also determine e.g., how much tension each spoke carries as it rotates to the top of the wheel during operation.

Because of e.g., the integral construction, prior non-pneumatic wheel constructions are not readily amenable to substituting different spokes into the non-pneumatic wheel, substituting differed hubs into the non-pneumatic, wheel, or both. Such a substitution would require e.g., destructive steps to cut or extricate the spoke from the annular shear band of the non-pneumatic wheel. Additionally, because the spokes are joined or attached with the wheel hub, the substitution of different wheels hubs of different materials or configuration is not readily feasible for the same reason. Finally, prior manufacturing methods have not been conducive to incorporating reinforcements, shapes, layers of material and other features into the construction of the spoke.

Accordingly, a non-pneumatic wheel having spokes that can be removably attached to the hub, the annular shear band, or both, would be helpful. In addition, a method of manufacturing such a non-pneumatic wheel, and particularly to installing such spokes into the hub of the non-pneumatic wheel, would be very useful.

SUMMARY OF THE INVENTION

The present invention provides a non-pneumatic wheel including a hub and a non-pneumatic tire, as well as a method for mounting the non-pneumatic tire onto the hub. The hub is formed with grooves that receive the radially-inner ends of spokes of the non-pneumatic tire. In order to secure the tire onto the hub during assembly, the grooves with the radially-inner ends of the spokes received therein are pulled radially inward to decrease the diameter of the hub and increase tension in the spokes. Additional aspects and advantages of the invention will be set forth in part in the following description, or may be obvious from the description, or may be learned through practice of the invention.

In one exemplary embodiment, a non-pneumatic wheel is provided. The non-pneumatic wheel defines axial, radial, and circumferential directions. The non-pneumatic wheel includes an annular shear band supporting a ground contacting surface. A plurality of spokes extend along the radial direction. The spokes have radially-outer ends connected with the annular shear band. The spokes having radially-inner ends. A hub includes a central portion configured for supporting the wheel on a vehicle. The hub also includes an annular receiver supported on the central portion and extending circumferentially around the central portion.

This exemplary annular receiver includes a plurality of grooves spaced apart from each other along the circumferential direction. Each groove has a longitudinal axis extending along the axial direction. Each groove is configured for receipt of the radially-inner ends of the spokes. A plurality of bridges are spaced apart from each along the circumferential direction. Each bridge extends between a pair of the plurality of grooves. Each bridge comprises a pair of spans. The spans form an angle α<180 degrees that faces radially inward towards the axis of rotation of the non-pneumatic wheel.

In another exemplary aspect of the present invention, a method for mounting a non-pneumatic tire onto an annular receiver of a hub is provided. The non-pneumatic tire defines axial, radial, and circumferential directions. The non-pneumatic tire includes an annular shear band and a plurality of spoke. The spokes have radially-outer ends connected with the annular shear band. The spokes have radially-inner ends. The annular receiver defines a center and has a plurality of grooves spaced apart along the circumferential direction with each groove having a longitudinal axis extending along the axial direction. The method for mounting includes placing the hub into a central opening defined by the non-pneumatic tire; inserting the radially-inner ends of the spokes into the grooves of the hub; and pulling the grooves with the radially inner-ends of the spokes towards the center of the annular receiver.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Use of the same or similar reference numerals in the figures denotes the same or similar features.

DETAILED DESCRIPTION OF THE INVENTION

For purposes of describing the invention, reference now will be made in detail to embodiments and aspects of the invention, one or more examples of which are illustrated in the drawings. Each example is provided by way of explanation of the invention, not limitation of the invention. In fact, from the teachings disclosed herein, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

As used herein, the following definitions apply.

Axial direction A refers to a direction parallel to an axis about which a referenced exemplary wheel or tire rotates during use.

Radial direction R refers to a direction perpendicular to axial direction A with radially-outer or radially outward referring to a general direction away from axial direction A, and radially-inner or radially inward referring to a general direction towards axial direction A.

Circumferential direction C refers to a direction defined by defined by the circumference of the wheel or tire, or the direction of rotation of the wheel or tie about an axis.

Figure 1:
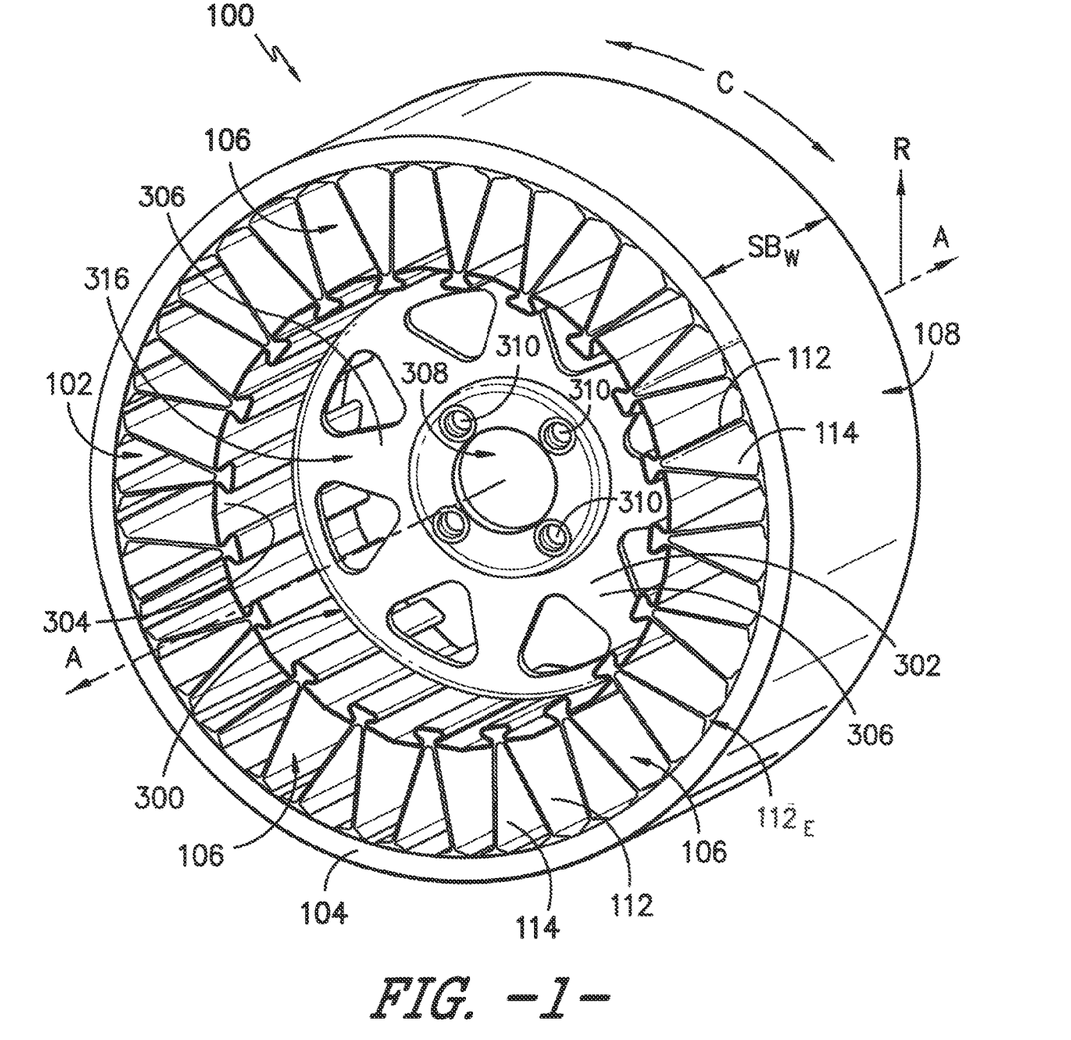
FIG. 1 provides a perspective view of an exemplary embodiment of a non-pneumatic wheel of the present invention including a hub and non-pneumatic tire mounted thereon.
Figure 2:
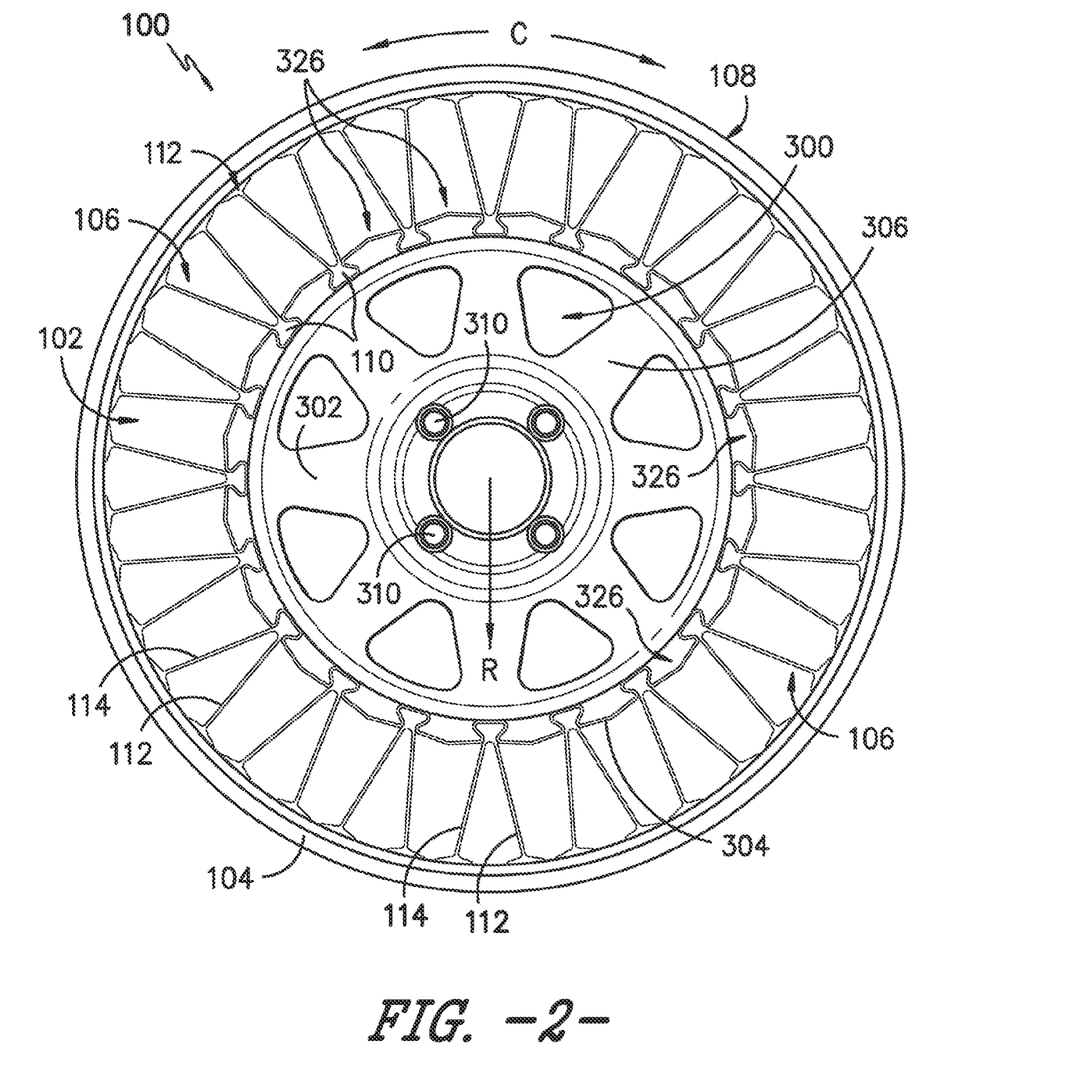
FIG. 2 is a front view of the exemplary embodiment of a non-pneumatic wheel shown in FIG. 1.

FIGS. 1 and 2 illustrate an exemplary embodiment of a non-pneumatic wheel 100 of the present invention. Wheel 100 includes a non-pneumatic tire 102 supported on a hub 300, which includes an annular receiver 304 that may be connected with a central p01iion 302. Non-pneumatic tire 102 includes an annular shear band 104 that extends circumferentially around wheel 100 and has an axial width $SB_W$. A plurality of spokes 106 of tire 102 are connected with shear band 104, connected with annular receiver 304 of hub 300, and spaced apart along circumferential direction C as will be further described.

Central portion 302 of hub 300 is configured for supporting wheel 100 on a vehicle. In this exemplary embodiment, hub 300 includes a plurality of spokes or arms 306 extending radially outward to annular receiver 304 from a centroid 308 (FIG. 1) or the axis of rotation of hub 300. A plurality of openings 310 allow for insertion of fasteners to secure hub 300 (and thereby non-pneumatic Wheel 100) to a vehicle. Central portion 302 may be e.g., inserted into opening 316 formed by annular receiver 304. Central portion 302 may be welded to annular receiver 304, formed integrally therewith, and/or secured by fasteners extending between. The appearance and features of hub 300 are provided by way of example only and other configurations may be used as well.

Annular shear band 104 may include one or more reinforcing bands, reinforcing plies, shear layers, and other components (not shown). For example, shear band 104 may be constructed with a radially-inner reinforcing band, an radially-outer reinforcing hand, and a shear layer positioned therebetween. The shear layer may be constructed e.g. of an elastomeric material such as e.g., natural and synthetic rubbers, polyurethanes, foamed rubbers and polyurethanes, segmented copolyesters, and block co-polymers of nylon. The reinforcing bands may include reinforcements constructed from e.g., essentially inextensible cord reinforcements embedded in an elastomeric coating. Such reinforcements may include e.g., any of several materials suitable for use as tire belt reinforcements in conventional tires such as cords of steel, composites of glass and resin such as e.g., fiberglass reinforced plastics, and other materials having a high modulus in tension and compression. In still another example, shear band 104 includes reinforcing plies, with each ply including cables that extend substantially along the circumferential direction C and may also be wrapped about axial direction A.

Shear band 104 provides a stiffness that allows spokes 106 to support hub 300 intension during use of wheel 100 on a vehicle. As wheel 100 rolls across the surface of the ground, hub 300 "hangs" from shear band 104 through a portion of the plurality of spokes 106 that are in tension near the top of wheel 100 opposite the ground contacting portion of shear band 104. The portion of spokes 106 in tension changes as wheel 100 rolls and different spokes move into position opposite the ground contacting portion of shear band 104. At the same time, shear band 104 provides a resiliency or compliance over the ground surface that provides for a smoother, more comfortable ride.

Shear band 104 is depicted in FIGS. 1 and 2 as having a smooth, radially-outer surface 108. However, outer surface 108 may be provided with a tread having e.g., grooves, ribs, blocks, or other features for enhancing traction performance. The tread can be molded directly into outer surface 108 or may be provided as a tread portion wrapped around wheel 100 and attached thereto. Other configurations may be used as well. is depicted in FIGS. 1 and 2 as having a smooth, radially-outer surface 108. However, outer surface 108 may be provided with a tread having e.g., grooves, ribs, blocks, or other features for enhancing traction performance. The tread can be molded directly into outer surface 108 or may be provided as a tread portion wrapped around wheel 100 and attached thereto. Other configurations may be used as well.

Figure 3:
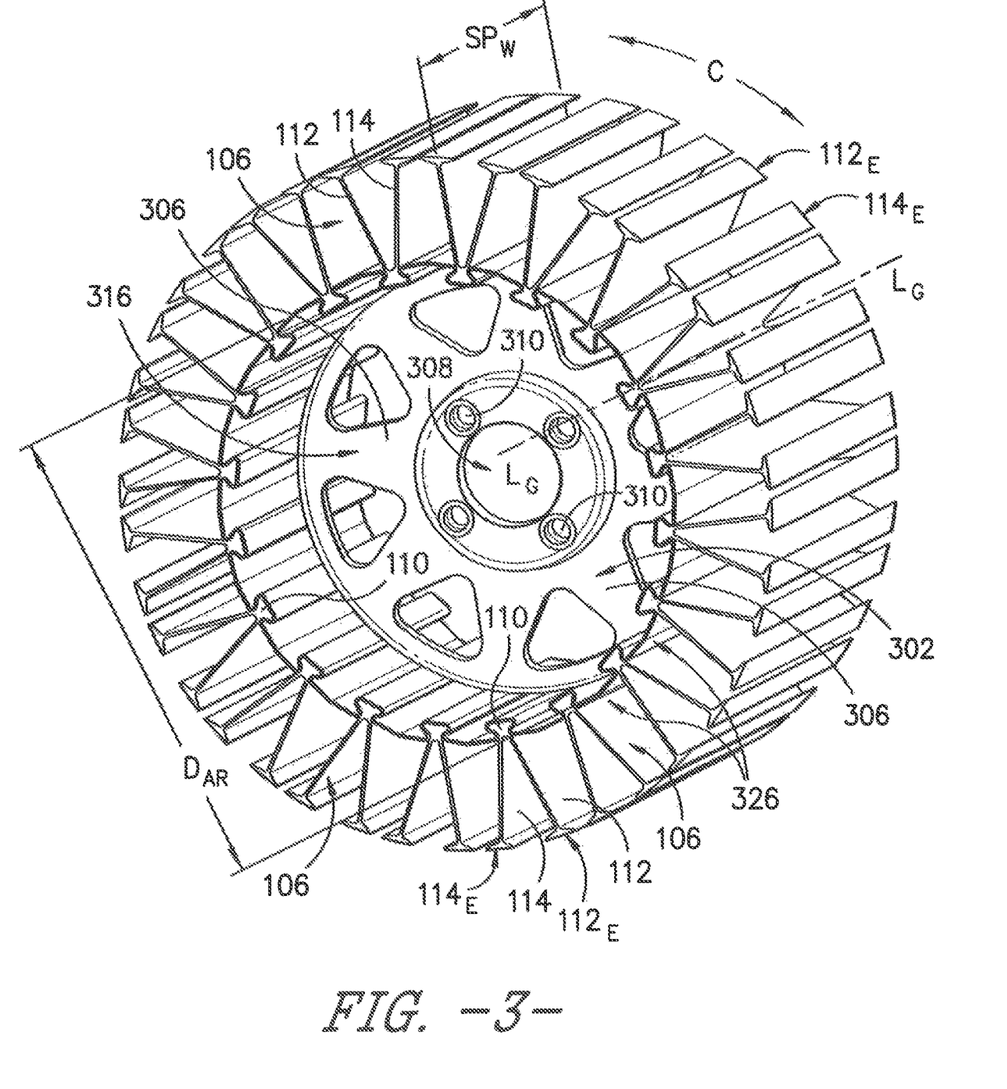
FIG. 3 is a perspective view of an exemplary hub and spokes of the wheel in FIGS. 1 and 2 with an annular shear band removed for purposes of illustration.
Figure 4:
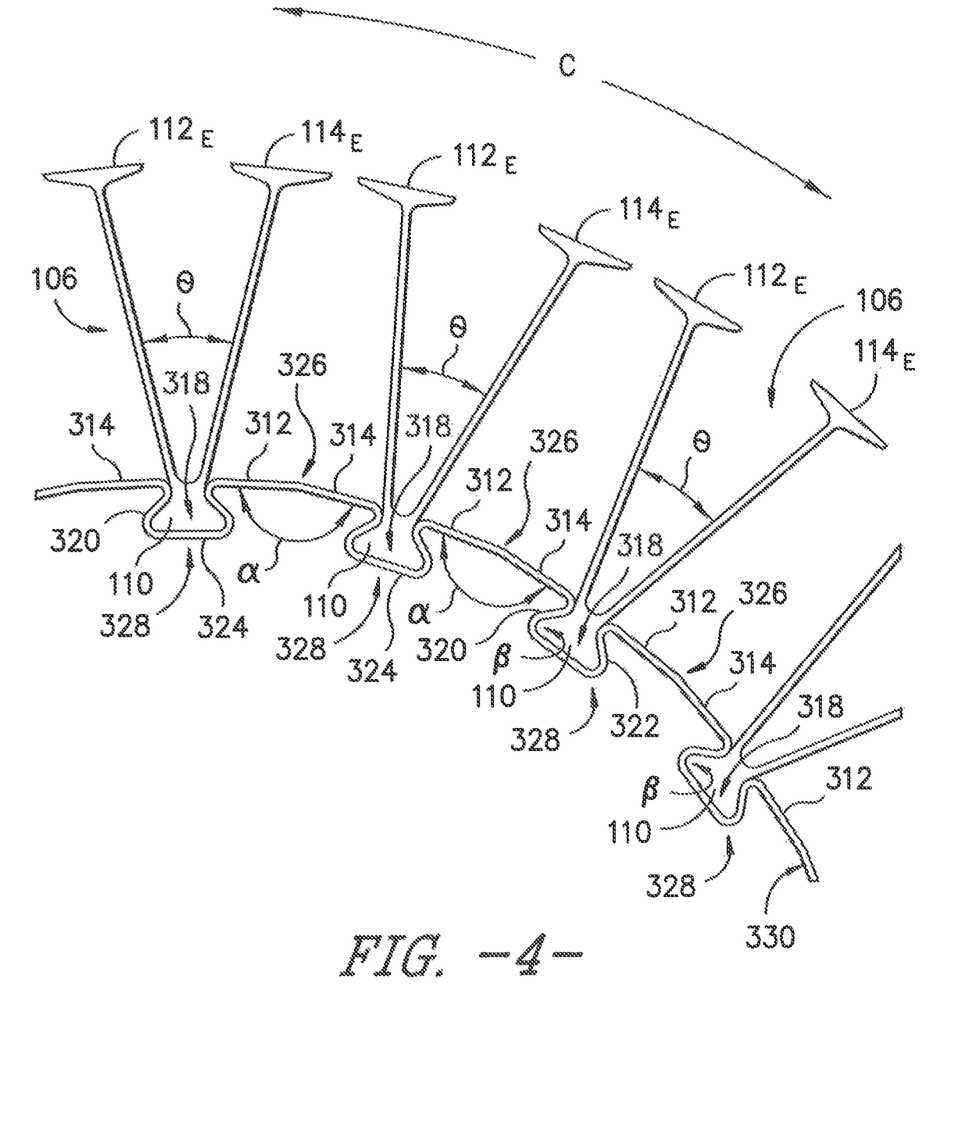
FIG. 4 is a close up, side view of a portion of the annular receiver forming part of the exemplary hub depicted in FIGS. 1, 2, and 3.
Figure 5:
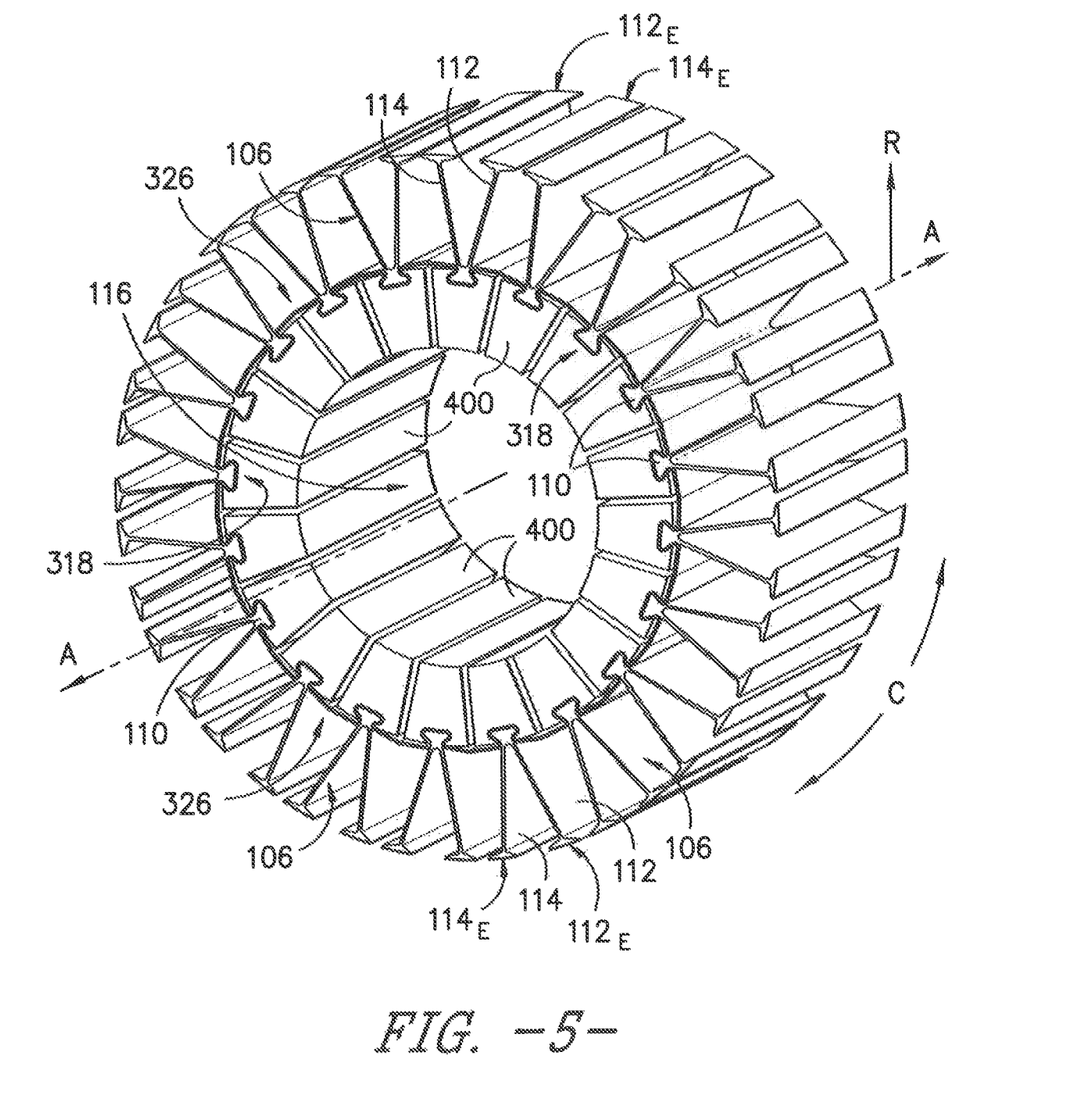
FIG. 5 is a perspective of the exemplary hub of FIGS. 1 through 4 during mounting of the non-pneumatic tire thereon with the annular shear band removed for purposes of illustration.

Referring now to FIGS. 3, 4, and 5, annular receiver 304 includes a plurality of grooves 318 spaced apart from each other along circumferential direction C. Each groove 318 defines a longitudinal axis $L_G$ (FIG. 3) extending parallel to axial direction A. Each groove is formed by a pair of opposing sides 320 and 322 and connected by a base 324, which together give groove 318 a particular shape when viewed along axial direction A as shown in FIG. 4. Each side 320 and 322 forms an acute angle β with base 324 that faces inwardly to towards groove 318 and is in the range of 30 degrees≤β≤60 degrees for this exemplary embodiment. As such, grooves 318 have a cross-sectional shape configured for complementary receipt of radially-inner ends of spoke 106. Other cross-sectional shapes may be used as well.

Along circumferential direction C, each groove 318 is positioned between a pair of bridges 326. Bridges 326 are spaced apart from each other along circumferential direction C and separated by grooves 318. More particularly, each bridge 326 extends between a pair of the plurality of grooves 328. Each bridge 326 is created by a pair of spans 312, 314 formed by annular receiver 304. As shown in the side view of FIG. 4, spans 312 and 314 each have linear profile as viewed along axial direction A. For this exemplary embodiment, grooves 318 and spans 312, 314 maintain a continuous and uninterrupted profile along axial direction A, as shown in FIG. 4, over the entire axial width of annular receiver 304.

In one exemplary embodiment, annular receiver 304 is constructed from a single, continuous sheet of metal having axial width $W_{AR}$, which may be of the same magnitude as axial width $SB_W$ of annular shear band 104. Such sheet may be bent and/or folded to form bridges 326 and grooves 318 along circumferential direction. Ends of the sheet are then welded together to create the circular shape of annular receiver 304. Central portion 302 can then be inserted into the interior of annular receiver 304 and welded thereto. Other methods of construction may be used as well.

Each spoke 106 includes a radially-inner end 110. Each radially-inner end 110 is received into one of the grooves 318 of annular receiver 304 to secure tire 102 thereto. Each spoke 106 includes a pair of legs 112, 114 connected to form radially-inner end 110. Moving radially outward from end 110, legs 112 and 114 diverge from each other and form an angle 8. For this exemplary embodiment, angle 8 is in the range of 10 degrees ~8~45 degrees. Each leg 112 and 114 has a radially outer end 112E and 114E, respectively, that is connected directly with annular shear band 104 in this exemplary embodiment. In other embodiments, spoke 106 may be connected indirectly with annular shear band 104.

In one exemplary embodiment, each spoke 106 may include a plurality of reinforcement elements (not shown) provided as inextensible cords extending adjacent and parallel to each other along radial direction R or at other angles to radial direction R. For one exemplary embodiment, as used herein, "inextensible" means the material has an elongation at break of 12 percent or less as measured at 23° C. according to ASTM 885. By way of example, such inextensible cords may be constructed from nylon, steel, combinations thereof, and other materials as well. Such cord may be positioned across the entire axial width $SP_W$ (FIG. 3) of spoke 106 or, alternatively, may be positioned across only a portion of width $SP_W$. Such cords may be encased or embedded within one or layers of polymeric materials such as rubber forming spoke 106. Additional examples of spokes as may be used with the present invention are described in e.g. PCT International Application No. PCT/IB2015/058420, commonly owned by the assignees of the present invention, and incorporated here in its entirety by reference for all purposes.

An exemplary method of mounting tire 102 onto hub 300 will now be described. Using the teachings disclosed herein, one of skill in the art will understand that the exemplary method may be used with other exemplary wheels, tires and/or apparatuses of the invention as well to provide additional exemplary methods. As used herein, the term "method" or "process" refers to one or more steps that may be performed in other ordering than shown without departing from the scope of the presently disclosed invention. As used herein, the term "method" or "process" may include one or more steps performed in whole or in part at least by one electronic or computer-based apparatus. Any sequence of steps is exemplary and is not intended to limit methods described herein to any particular sequence, nor is it intended to preclude adding steps, omitting steps, repeating steps, or performing steps simultaneously.

According to this exemplary method, hub 300 (or at least annular receiver 304) is placed into a central opening 116 (FIG. 5) that is formed by tire 102 and, more particularly, by the radially inner ends 110 of spokes 106 as shown in FIG. 5. As hub 300 is inserted, the radially-inner end 110 of each spoke 106 is inserted into one of the grooves 318. More particularly, each radially-inner end 110 is slid along axial direction A into a groove 318 resulting in each groove 318 having an end 110 as depicted FIG. 5.

Figure 6:
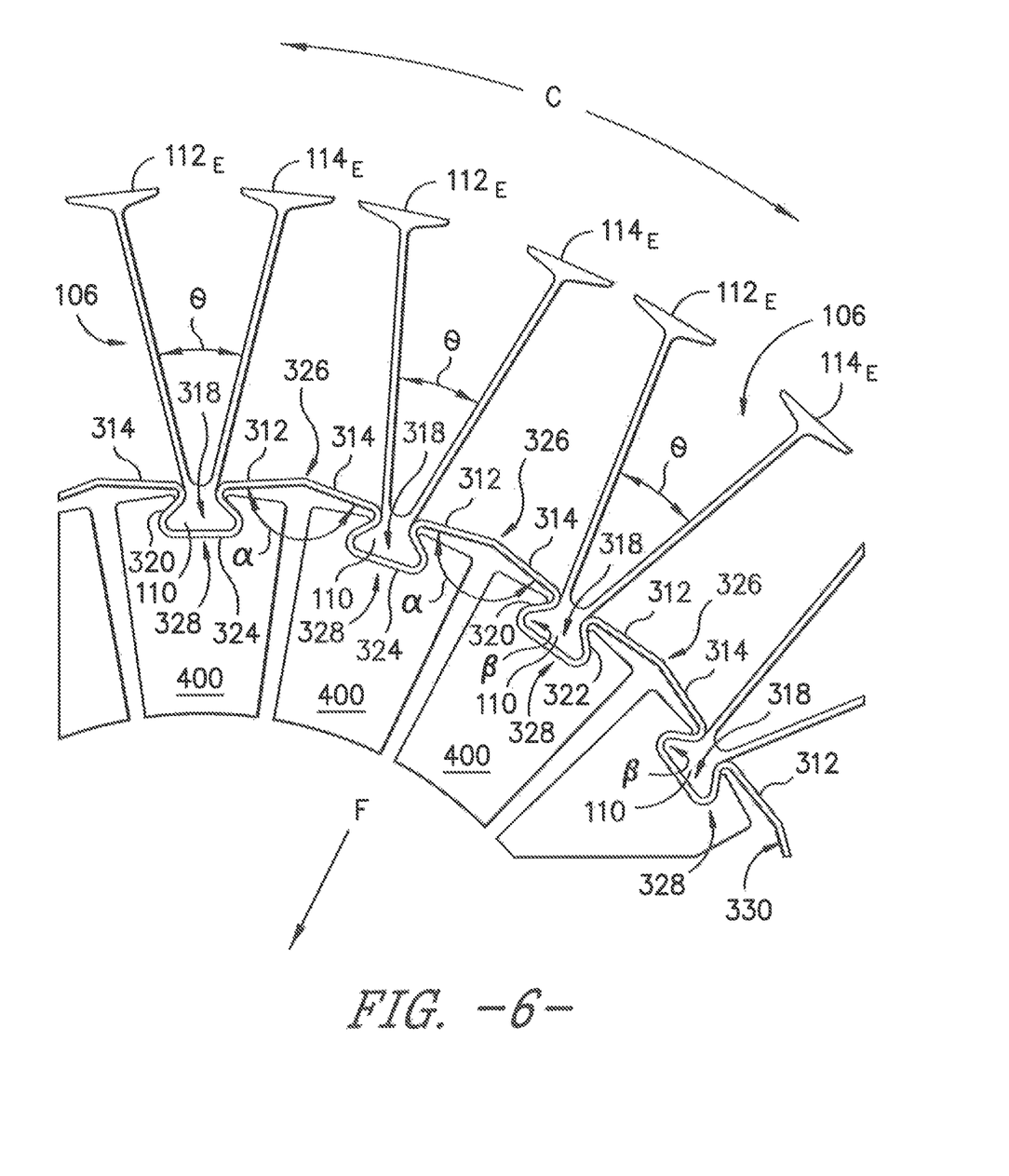
FIG. 6 is another close up, side view of a portion of the annular receiver forming part of the exemplary hub depicted in FIGS. 1, 2, and 3.

Next, a tension is applied to each spoke 106 that secures tire 102 onto hub 300 and slightly changes the shape of annular receiver 304. More particularly, as shown in FIG. 6, a machine with grippers 400 is connected with each projection 328 formed by the radially inner surface 330 of annular receiver 304. Such machine applies force F, which simultaneously pulls each projection 328 radially inward towards the axis of rotation or centroid 308 of hub 300.

As shown in FIG. 4, each pair of spans 312, 314 forms an angle α facing radially inwards towards the axis of rotation of wheel 100 or centroid 308. Before application of force F, angle α is in the range of 135<α<180 as shown in FIG. 4. During application of force F, angle α decreases, which in turn decreases the diameter $D_{AR}$ of annular receiver 304 (FIG. 3). The reduction in angle α between each pair of spans 312 and 314 along with the decrease in diameter $D_{AR}$ increases the tension in each leg 112, 114 of each spoke 106—thereby securing tire 102 onto hub 300. The amount of such tension is determined, in part, by the amount of such decrease in diameter of angle α and diameter $D_{AR}$. As such, through a controlled application of force F, the amount of tension in each spoke 106 can be selectively determined.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is way of example rather than by way of limitation, and the subject disclosure does not preclude inclusion of such modifications, variations and/or additions to the present subject matter as would be readily apparent to one of ordinary skill in the art.

What is claimed is:

1. A non-pneumatic wheel defining an axis of rotation and defining axial, radial, and circumferential directions, the non-pneumatic wheel comprising:
   an annular shear band supporting a ground contacting surface;
   a plurality of spokes extending along the radial direction, the spokes having radially-outer ends connected with the annular shear band, the spokes having radially-inner ends;
   a hub comprising a central portion configured for supporting the wheel on a vehicle, and an annular receiver supported on the central portion and extending circumferentially around the central portion, the annular receiver comprising:
   a plurality of grooves spaced apart from each other along the circumferential direction, each groove having a longitudinal axis extending along the axial direction, each groove configured for receipt of the radially-inner ends of the spokes; and
   a plurality of bridges spaced apart from each other along the circumferential direction, each bridge extending between a pair of the plurality of grooves, each bridge comprising a pair of spans forming an angle $\alpha < 180$ degrees facing radially-inward towards the axis of rotation.

2. The non-pneumatic wheel of claim 1, wherein the annular receiver comprises a metal sheet shaped to form the plurality of grooves and the plurality of bridges.

3. The non-pneumatic wheel of claim 1, wherein the angle $\alpha$ faces radially inward towards the central portion.

4. The non-pneumatic wheel of claim 3, wherein the angle $\alpha$ is in a range 135 degrees $\leq \alpha < 180$ degrees.

5. The non-pneumatic wheel of claim 1, wherein each groove is defined by a base extending between a pair of opposing sides.

6. The non-pneumatic wheel of claim 5, wherein each of the opposing sides forms an acute angle $\beta$ facing radially inwardly towards the groove.

7. The non-pneumatic wheel of claim 6, wherein the angle $\beta$ is in a range 30 degrees $\leq \beta < 60$ degrees.

8. The non-pneumatic wheel of claim 1, wherein the pair of spans have a linear shape as viewed along the axial direction.

9. The non-pneumatic wheel of claim 1, wherein each groove maintains a continuous profile along the axial direction.

10. The non-pneumatic wheel of claim 9, wherein the longitudinal axis of each groove is parallel to the axial direction.

11. The non-pneumatic wheel of claim 1, wherein the plurality of spokes each comprise a pair of legs connected at the radially inward end and diverging radially outward to a pair of radially outward ends that are connected with the annular shear band.

12. A method for mounting a non-pneumatic tire onto an annular receiver of a hub;
   the non-pneumatic tire defining axial, radial, and circumferential directions;
   the non-pneumatic tire having an annular shear band and a plurality of spokes; the spokes having radially-outer ends connected with the annular shear band, the spokes having radially inner ends;
   the annular receiver defining a center and having a plurality of grooves spaced apart along the circumferential direction with each groove having a longitudinal axis extending along the axial direction;
   the method for mounting comprising:
   placing the hub into a central opening defined by the non-pneumatic tire;
   inserting the radially-inner ends of the spokes into the grooves of the hub; and
   pulling the grooves with the radially inner-ends of the spokes towards the center of the annular receiver.

13. The method for mounting a non-pneumatic tire as in claim 12, wherein the annular receiver comprises a plurality of spans positioned in pairs between the grooves along the circumferential direction, each span forming an angle $\alpha$ facing radially inwardly towards the center of the annular receiver, the method further comprising decreasing the angle $\alpha$ during the pulling.

14. The method for mounting a non-pneumatic tire as in claim 13, wherein the angle $\alpha$ is in the range of 180 degrees $< \alpha \leq 175$ degrees before the pulling and decreasing.

15. The method for mounting a non-pneumatic tire as in claim 12, wherein angle $\alpha$ is less than 175 degrees after the pulling and decreasing.

16. The method for mounting a non-pneumatic tire as in claim 12, wherein the annular receiver defines a diameter, and wherein the pulling decreases the diameter of the annular receiver.

17. The method for mounting a non-pneumatic tire as in claim 16, wherein the annular receiver comprises a continuous sheet of metal, the method further comprising buckling the sheet of metal during the pulling.

18. The method for mounting a non-pneumatic tire as in claim 12, further comprising attaching a central portion to the hub.

* * * * *